No. 694,174. Patented Feb. 25, 1902.
A. W. NEWELL.
PORTABLE HEATING AND COOKING SHELF.
(Application filed Sept. 23, 1901.)
(No Model.)
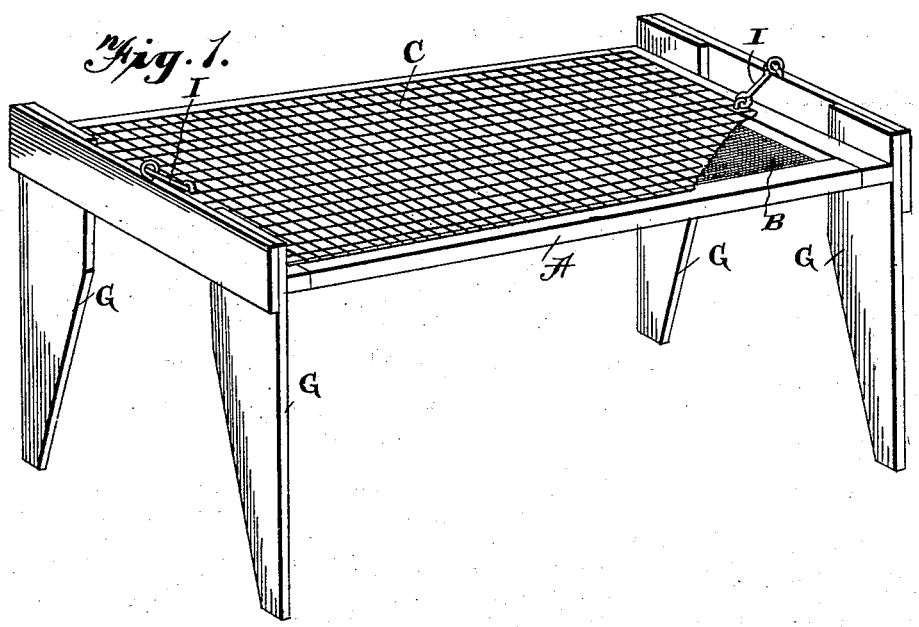
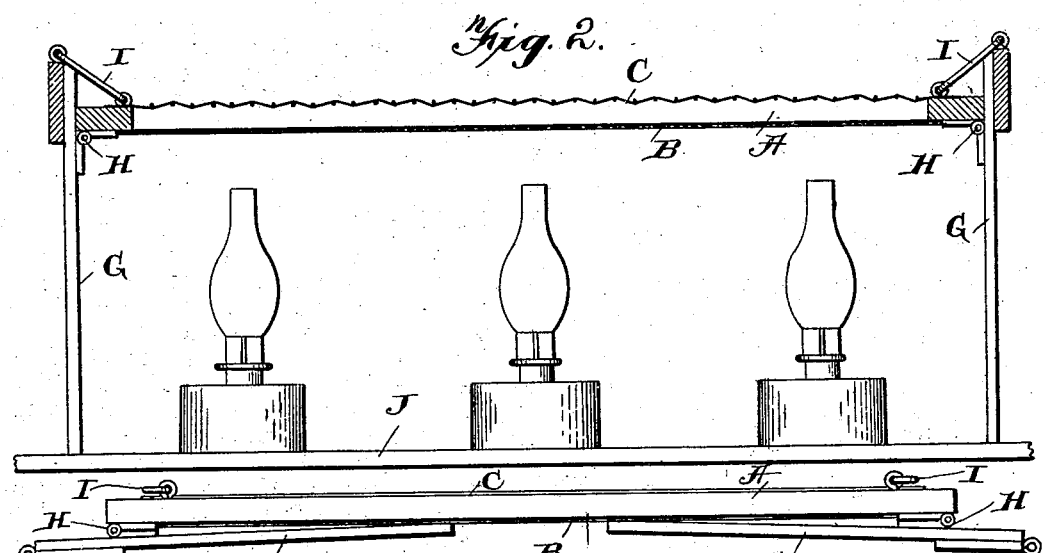
Witnesses
Geo. E. Druch.
Chas. P. Bright Jr.
Inventor
A. W. Newell,
By A. S. Pattison
Attorney

UNITED STATES PATENT OFFICE.

AUGUSTUS WILLIAM NEWELL, OF BRADFORD, PENNSYLVANIA.

PORTABLE HEATING AND COOKING SHELF.

SPECIFICATION forming part of Letters Patent No. 694,174, dated February 25, 1902.

Application filed September 23, 1901. Serial No. 76,265. (No model.)

*To all whom it may concern:*

Be it known that I, AUGUSTUS WILLIAM NEWELL, a citizen of the United States, residing at Bradford, in the county of McKean and State of Pennsylvania, have invented new and useful Improvements in Portable Heating and Cooking Shelves, of which the following is a specification.

My invention relates to improvements in portable heating and cooking shelf, and pertains to a light portable device with which an ordinary illuminating lamp or lamps are adapted to be used.

The object of my invention is to provide a light portable heating and cooking shelf with which one or more ordinary illuminating-lamps may be used, the same being so constructed that the lamp or lamps used for the heating or cooking at the same time serve to furnish light in the room in which the shelf is being used, thus serving the double purpose of either heating or cooking and at the same time lighting the room.

This device is especially intended for use in sick-rooms for light, heating, and cooking, for heating flat-irons, for toilet-work or light ironing, and for heating hair-tongs or curling-irons.

In the accompanying drawings, Figure 1 is a perspective view of my portable heating and cooking shelf, the same being shown of a sufficient size to accommodate quite a number of lamps. Fig. 2 is a vertical longitudinal sectional view of the same. Fig. 3 is a view showing the shelf folded for transportation or to be carried around from place to place.

In the drawings, A indicates a frame, which is here shown rectangular in form, but may be of any desired contour without in any manner affecting my invention. The frame in actual use is about one inch thick and has secured to its under side a fine wire-gauze B and to its upper side a heavy woven-wire or perforated metal sheet C. This frame is supported upon folding legs G, which are hinged thereto by the hinges H, the same being attached to the under side of the frame A and extending downward along the inner sides of the said folding legs. By means of hooks and eyes I the legs are supported firmly in their extended positions, as shown in Figs. 1 and 2, when the article to be heated or cooked is placed thereon, the whole being sufficiently strong to support a considerable amount of weight. A lamp or lamps J are placed upon a suitable supporting shelf or table J, upon which the heating and cooking shelf is supported, and the lamps placed thereunder. Preferably the shelf is elongated, as here shown, whereby a number of articles may be heated or cooked simultaneously, as many lamps being used as may be necessary to affect the desired heating or cooking. It will also be noted that the device being practically entirely open under the heating and cooking shelf, the lamps, in addition to heating and cooking, are doing duty in the lighting of the room.

The upper heavy woven-wire or perforated sheet metal C is for the purpose of supporting the article containing the material being cooked, and the fine wire-gauze attached to the under side of the shelf is for the purpose of obstructing the passage of smoke and gases to the cooking utensil above. In practice it is found that this fine wire-gauze serves to intercept and to catch any small amount of smoke from a lamp or lamps which would otherwise be deposited upon the under side of the utensils placed upon the supporting-screen above, and also very effectually serves to deflect a considerable amount of the escaping gases from the lamps, while it allows the passage of the heat from the lamps to the utensils supported by the heavy supporting-wire or perforated plate thereabove.

When the device is folded, as shown in Fig. 3, it is adapted to be conveniently placed in the trunk and readily transported or carried from room to room in a house. It is especially adapted for use in country houses where gas is not obtainable and is found to be exceedingly efficient for the purposes herein mentioned.

Having thus described my invention, what I claim, and desire to secure by Letters Patent, is—

1. A portable heating and cooking shelf, comprising an open frame having at its under side a fine wire-gauze smoke and gas intercepting member, at its upper side a heavy supporting open-work member, hinged folding legs therefor, and holding members for the legs when they are extended, substantially as described.

2. A heating and cooking shelf comprising an elongated open frame adapted to receive thereunder a number of lamps, supporting-legs therefor of a height greater than the height of the lamps and their chimneys, the said open frame having at its under side a smoke and gas intercepting fine wire-gauze, and at its upper side a heavy open-work supporting member, separated from the said wire-gauze, substantially as described.

3. A heating and cooking shelf comprising an open frame having at its under side a smoke and gas intercepting fine wire-gauze member and at its upper side a heavy open-work supporting member, depending legs having a transverse connecting member at their upper ends, and said legs hinged to the under side of the said open frame, and connecting members between the upper side of the open frame and the said transverse member of the legs, substantially as described.

In testimony whereof I have hereunto set my hand in the presence of two subscribing witnesses.

AUGUSTUS WILLIAM NEWELL.

Witnesses:
PHEBE L. NEWELL,
HENRY F. NEWELL.